United States Patent Office
3,386,954
Patented June 4, 1968

3,386,954
PRODUCTION OF HIGH MOLECULAR WEIGHT LINEAR POLYCARBONATES FROM OLIGOMERIC CYCLIC CARBONATES
Hermann Schnell, Krefeld-Uerdingen, and Ludwig Bottenbruch, Krefeld-Bockum, Germany, assignors to Farbenfabriken Bayer Aktiengesellschaft, Leverkusen, Germany, a corporation of Germany
No Drawing. Continuation-in-part of applications Ser. No. 213,033 and Ser. No. 213,037, July 27, 1962. This application Oct. 3, 1963, Ser. No. 313,456
Claims priority, application Germany, Aug. 2, 1961, F 34,590; Oct. 6, 1962, F 39,436
4 Claims. (Cl. 260—47)

This invention relates to novel polycarbonate compositions, and is a continuation-in-part of my copending applications Ser. Nos. 213,033 and 213,037, now abandoned, both filed July 27, 1962. More specifically, the inventive concept herein resides in unique high molecular weight linear polycarbonates and their method of preparation.

It is known in the prior art to produce high molecular weight linear polycarbonates by the polycondensation of aromatic dihydroxy compounds such as, dihydroxy diaryl alkanes, cyclo alkanes, ethers, sulphides, sulphonoxides or by using mixtures of aromatic and aliphatic cyclo aliphatic dihydroxy compounds with derivatives of carbonic acid, such as carbonic acid halides, bis chloro carbonic acid esters or dialkyl or diaryl alkanes. The polycarbonates made via this piror art method have been found to be relatively unstable at elevated temperatures.

It is, therefore, an object of this invention to provide high molecular weight linear polycarbonates. A further object of this invention is to provide high molecular weight linear polycarbonates which are stable at elevated temperatures. A still further object of this invention is to provide a new method for the production of high molecular weight linear polycarbonates. A still further object of this invention is to provide a novel process for the polymerized cyclic carbonates.

The foregoing objects and others which will become apparent from the following description are accomplished in accordance with this invention, generally speaking, by providing novel linear polycarbonate produced by heating a cyclic carbonate in the presence of water or an organic hydroxy compound.

In contradistinction to the corresponding previously known cyclic carbonates and the linear polycarbonates above mentioned, the compositions of this invention in their pure form are exceptionally stable at elevated temperatures. In a co-pending application, Ser. No. 313,431, filed Oct. 3, 1963, the process for producing an oligomeric cyclic carbonate of the formula

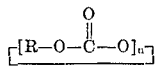

has been disclosed wherein R is the residue remaining after removing the hydroxyl groups from a binuclear, aromatic dihydroxy compound wherein the nuclei are joined by an atom which does not belong to either nucleus. $n$ is a low whole number greater than 1.

The composition indicated by the above formula may be produced by reacting such a binuclear aromatic dihydroxy compound with phosgene or bis chloro carbonic acid esters in the presence of an acid binding agent in a highly dilute solution. In contradistinction to the corresponding previously known cyclic carbonates of glycols, the above mentioned cyclic carbonates are, in pure form, exceptionally temperature stable. They can be heated to well over 350° C. without alteration, apart from the fact that some of them already melt below this temperature.

It has now been found that the above mentioned cyclic carbonates, upon heating to temperatures above 200° C. in the presence of small amounts of water and/or organic hydroxy compounds, polymerize in a short time to give pure linear polycarbonates which may be of exceptionally high molecular weight.

Furthermore the polycarbonates obtained according to the present invention have an essentially narrower variation of molecular weights than the polycarbonates known in the art.

As a characteristic for the distribution of molecular weights of high molecular weight linear substances is the term "heterogeneity" defined by G. B. Schulz (Z physik. Chem. (b) 43 (1939) 25; 47 (1940) 155; (Z. Elektrochem. 60 (1956) 199) as:

$$U = \frac{P_\mathrm{W}}{P_\mathrm{n}} - 1$$

where $U$=heterogeneity; $P_\mathrm{W}$=average weight of the molecular weight; $P_\mathrm{n}$=numerical mean of the molecular weight.

As a rule the "heterogeneity" is as greater as the relative viscosity and the molecular weight respectively is higher.

In fact, however, the mechanical properties of a high molecular weight linear substance depend not only on its distribution of molecular weight, but, as known, on its average molecular weight. Thus high molecular weight substances have at a higher molecular weight better properties than at lower molecular weight. The average molecular weight must therefore be considered in order to judge the "quality" of a high molecular weight substance from its "heterogeneity."

In Table 1, therefore certain relative viscosities are correlated to the "heterogeneity" which according to our experiences represent critical values for good mechanical properties. The viscosities are measured in 0.5 percent methylene chloride solutions at 20° C.; they are proportional to the molecular weight. The "heterogeneities" are determined by fractionation. Polycarbonates which have smaller "heterogeneities" than those shown in Table 1 for their relative viscosities have good mechanical properties.

Table

| Relative viscosity: | Heterogeneity |
|---|---|
| 1.28 | 0.21 |
| 1.30 | 0.32 |
| 1.32 | 0.41 |
| 1.34 | 0.47 |
| 1.36 | 0.52 |
| 1.38 | 0.57 |
| 1.40 | 0.62 |
| 1.42 | 0.65 |
| 1.44 | 0.68 |
| 1.46 | 0.71 |
| 1.48 | 0.74 |
| 1.50 | 0.77 |

In comparison to these values, as an example, the "heterogeneities" of the polycarbonates derived from 2,2-(4,4'-dihydroxydiphenyl)-propane obtained according to the present invention correlated to the corresponding relative viscosities are at most about 50%, often still much lower. Thus, the "heterogeneity" of a product with the relative viscosity of about 1.32, obtained with the addition of p-tert. butylphenol as a chain breaker, was determined to about 0.17. On the other hand the lowest "heterogeneities" which may be obtained with polycarbonates known in the art are about 65–75% of the values given in the above table. Polycarbonates with a very less "heterogeneity" have especially an improved elongation and notch strength.

There is thus provided a new method for the production of high molecular weight linear polycarbonates based on the above mentioned binuclear, aromatic dihydroxy compounds which, in contradistinction with the known polycondensation processes, possess all the advantages which are achieved in the production of high molecular weight materials by polymerization. Thus, for example, it is now possible to produce high molecular weight polycarbonates, for example, without bubble formation, in blocks, possibly in molds or in thin layers as coatings, adhesive layers and the like by simple heating. Furthermore, it should be mentioned that the starting materials, i.e. cyclic carbonates of the above mentioned type can be obtained in exceptionally pure form, for example, by recrystallization which is of particular advantage for the properties of the polycarbonates.

As examples of cyclic carbonates which can be polymerized according to the invention there may be mentioned, for example, those obtained from the following dihydroxy compounds: 4,4'-dihydroxydiphenyl methane, 1,1-(4,4'-dihydroxydiphenyl) - ethane, -butane, -isobutane, 2,2-(4,4' - dihydroxydiphenyl) - propane, -butane and -pentane, 1,1 - (4,4' - dihydroxydiphenyl) - cyclopentane and -cyclohexane, 4,4' - dihydroxy - 3,3' - dimethyldiphenyl methane, 2,2 - (4,4' - dihydroxy - 3,3'-dimethyldiphenyl)-propane, 2,2 - (4,4' - dihydroxy - 3,3' - dimethoxy-diphenyl) - propane, 2,2 - (4,4' - dihydroxy - 3,3',5,5'-tetrachloro - diphenyl) - propane, 2,2 - (4,4' - dihydroxy-3,3' - dichlorodiphenyl) - propane, 2,2 - (4,4' - dihydroxy-3,3',5,5' - tetrabromo - diphenyl) - propane, 4,4' - dihydroxy - diphenyl ether, 4,4' - dihydroxy diphenyl sulphone, 4,4' - dihydroxy - 3,3' - dimethyl diphenyl sulphone, 4,4' - dihydroxydiphenyl sulphoxide, 4,4' - dihydroxydiphenyl sulphide and 4,4' - dihydroxy - 3,3' - dimethyl diphenyl sulphide.

Preferred dihydroxy compounds from which the cyclic carbonates are derived are, for instance, 2,2 - (4,4' - dihydroxydiphenyl) - propane, 2,2 - (4,4' - dihydroxy - 3,3'-dimethyldiphenyl) - propane, 2,2 - (4, 4' - dihydroxy-3,3',5,5' - tetrachloro - diphenyl - propane, 1,1 - (4, 4'-dihydroxydiphenyl) - cyclohexane and 4,4' - dihydroxydiphenyl sulphide.

Hydroxy compounds which are able to initiate the polymerization according to the invention are, for example, phenol, the cresols and xylenols, the ethylphenols, p-tertiary butyl phenol, hydroquinone, resorcinol, pyrocatechol, dihydroxy diphenyl, the above mentioned bisphenols, as well as higher alcohols, such as butanol, pentanol, hexanol, heptanol, stearyl alcohol, and glycols, such as, for instance, ethyl glycol, diethyl glycol and dipropyl glycol, the butane diols, the pentane and hexane diols, cyclohexanol and so on.

The amounts of water to be added for starting the polymerization may be from about 0.001 to about 0.3% by weight while the amount of the organic hydroxy compounds mentioned above should be from about 0.05 to about 3% weight.

As preferred hydroxy compounds in addition to water there may be named p-tertiary-butyl phenol and the bisphenols mentioned above.

The polymerization, if desired, be accelerated by the addition of acidic and preferably basic catalysts, such as, lead oxide, zinc oxide, antimony trioxide, sodium methylate, the sodium salts of aromatic dihydroxy compounds, sodium stearate, magnesium stearate, basic zinc acetate or basic beryllium acetate and boron phosphate.

By the addition of the above organic hydroxy compounds or their esters, such as carbonates, as chain breakers, any desired degree of polymerization can be predetermined.

The cyclic carbonates can, if desired, also be polymerized in admixture with lower molecular weight polycarbonates of the same type or with other polycarbonates, whereby these are co-polymerized. By the addition of trifunctional organic hydroxy compounds or their esters, cross-linked insoluble mixed polymerizates can be obtained.

If desired, dyestuffs, pigments, fillers, plasticizers, stabilizers and the like can be added to the starting materials.

The polymerization can be carried out discontinuously, for example, in an autoclave, whereby the resultant polycarbonate melts can, in the usual manner, be spun from nozzles to give bristles and the bristles can be chopped up to a granulate. The process of this invention offers a special advantage, as already mentioned, when the polymerization is carried out in molds, whereby any desired high degree of polymerization can be achieved by subsequent thermal treatment, the relative viscosities of the polymers obtained, measured in 0.5% methylene chloride solution at 20° C., corresponding to 4.5 and more. Furthermore, the products are soluble without forming swollen bodies. Apart from other advantages, the thus produced products possess a particularly high heat stability.

The polymerization can also be carried out continuously, for example, in worm presses, whereby the high molecular weight polymeric product can be converted directly into the desired formed bodies, such as fibres, foils, films, rods, tubes, blown bodies and the like. Coatings from very high molecular weight polycarbonates can be produced, for example, by dipping the objects to be coated into a solution of the cyclic carbonate, evaporating the solvent and producing the high molecular weight polymeric film by heating.

The invention will be more specifically defined by the following examples. It should be noted, however, that these examples and the particulars disclosed therein will be given for the purpose of illustration only and are not to be taken as limiting.

Example 1

About 0.5 part by weight of a cyclic carbonate produced from 2,2-(4,4'-dihydroxy diphenyl)-propane, which has been dried to constant weight, are filled into a small glass tube, rinsed well with nitrogen, evacuated, melted and heated for two hours at 320° C. As is seen from the crystalline form and the viscosity measurement, the compound has not altered.

About 0.5 part by weight of the same carbonate are stored in air of 80% relative humidity for 15 hours. The takeup of water amounts to about 0.3%. The carbonate was then, as described above, packed into an ampoule and heated for 30 minutes at 315–317° C. The substance sinters. It is mixed with methylene chloride whereupon it swells to a remarkable extent and finally goes completely into solution without swollen bodies. The relative viscosity of the product obtained amounts to 8.0 (measured in 0.5% methylene chloride solution at 20° C.). This corresponds to an average molecular weight of about 420,000.

Example 2

About 0.5 part by weight of the water containing cyclic carbonate of Example 1 are mixed with about 0.0014 part by weight diphenyl carbonate (the amount corresponds to that calculated for a relative viscosity of 1.7). The mixture is packed into an ampoule and, as described in Example 1, heated for 30 minutes at 315–317° C. The product obtained dissolves completely in methylene chloride and has a relative viscosity of 1.75.

Example 3

About 0.5 part by weight of the dried cyclic carbonate of Example 1 are mixed with about 0.0014 part by weight of p-tertiary butyl phenol (the amount corresponds to that calculated for a relative viscosity of 1.50). The mixture is packed into an ampoule and as described in Example 1, heated for 30 minutes at 315–317° C. The product obtained dissolves in methylene chloride to give a viscous solution and has a relative viscosity of 1.48.

Example 4

About 0.5 part by weight of the dried cyclic carbonate from 1,1-(4,4'-dihydroxy diphenyl)-cyclohexane are mixed with about 0.0014 part by weight of p-tertiary butyl phenol and after filling into an ampoule, heated for 30 minutes at 317° C. as described in Example 1. The product obtained dissolves completely in methylene chloride and has a relative viscosity of 1.33.

Example 5

About 0.5 part by weight of the dried cyclic carbonate from 2,2-(4,4'-di-hydroxy - 3,3' - dimethyl-diphenyl)-propane are mixed with about 0.0014 part by weight p-tertiary butyl phenol and as described in Example 1, packed into an ampoule and heated for 30 minutes at 317° C. The product obtained a colorless, transparent mass, dissolves completely in methylene chloride. It has a relative viscosity of 1.32.

Although the invention has been described in considerable detail for the purpose of illustration, it is to be understood that variations can be made by those skilled in the art without departing from the spirit of the invention and the scope of the claims.

We claim:
1. A process for the production of high molecular weight linear polycarbonates having an extremely low heterogeneity which comprises heating, in the presence of a composition selected from the group consisting of water, phenols, alcohols, and mixtures thereof, oligomeric cyclic carbonates derived from a binuclear, aromatic dihydroxy compound, wherein the nuclei are joined by a member selected from the group consisting of lower alkylene, lower alkylidene, oxygen, sulfur, SO and $SO_2$ in a position para to the hydroxy groups, said oligomeric cyclic carbonates being obtained from the reaction of a binuclear aromatic dihydroxy compound with a carbonic acid derivative selected from the group consisting of phosgene and bis-chlorocarbonic acid esters of said binuclear aromatic dihydroxy compounds in the presence of an acid binding agent in a highly dilute solution.

2. The process of claim 1 wherein said components are heated to a temperature of about 200° C.

3. The process of claim 1 wherein the reaction is carried out in the presence of a catalyst.

4. The process of claim 3 wherein the catalyst is a member selected from the group consisting of lead oxide, zinc oxide, antimony trioxide, sodium methylate, sodium stearate, magnesium stearate, basic zinc acetate and basic beryllium acetate, sodium salts of aromatic dihydroxy compounds and boron phosphate.

References Cited

UNITED STATES PATENTS

| | | | |
|---|---|---|---|
| 3,240,755 | 3/1966 | Cawthon et al. | 260—47 |
| 3,274,214 | 9/1966 | Prochaska | 260—47 |
| 3,155,683 | 11/1964 | Moody | 260—47 |
| 3,193,529 | 7/1965 | Oxenrider | 260—47 |
| 3,220,975 | 11/1965 | Fox | 260—47 |
| 3,220,980 | 11/1965 | Prochaska | 260—47 |

FOREIGN PATENTS

| | | |
|---|---|---|
| 620,620 | 11/1962 | Belgium. |
| 1,329,899 | 5/1963 | France. |
| 937,891 | 9/1963 | Great Britain. |

OTHER REFERENCES

Schnell et al. "Makromolekulare Chemie," vol. 57 (10–62), pp. 1–11.

Schnell et al., "Angewandte Chemie," vol. 68, No. 20, pp. 633–640 (October 1956).

Schulz et al., "Makromolekulare Chemie," vol. 29, pp. 93–116 (January 1959).

SAMUEL H. BLECH, *Primary Examiner.*